Sept. 13, 1949.    J. POLÁCEK    2,481,683
TRICYCLE
Filed Feb. 23, 1946

Inventor.
Jiří Poláček

Patented Sept. 13, 1949

2,481,683

UNITED STATES PATENT OFFICE 2,481,683

TRICYCLE

Jiří Poláček, Rokycany, Czechoslovakia

Application February 23, 1946, Serial No. 649,543
In Germany January 12, 1942

2 Claims. (Cl. 280—282)

My invention relates to tricycles having a driven rear wheel and a pair of steered front wheels.

The known constructions of such tricycles are comparatively complicated and they are quite dangerous in view of their unstability resulting from the relatively high position of their center of gravity.

The main object of my invention is the elimination of the said defects of such tricycles.

Figure 1:
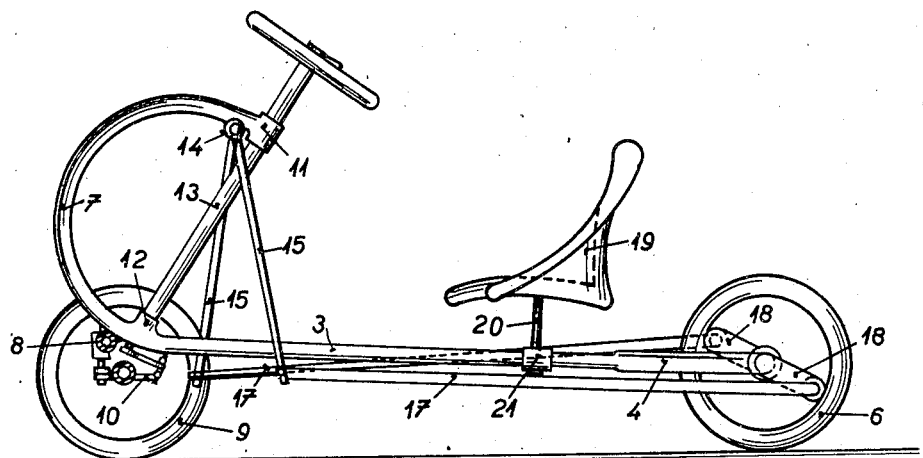
Figure 2:
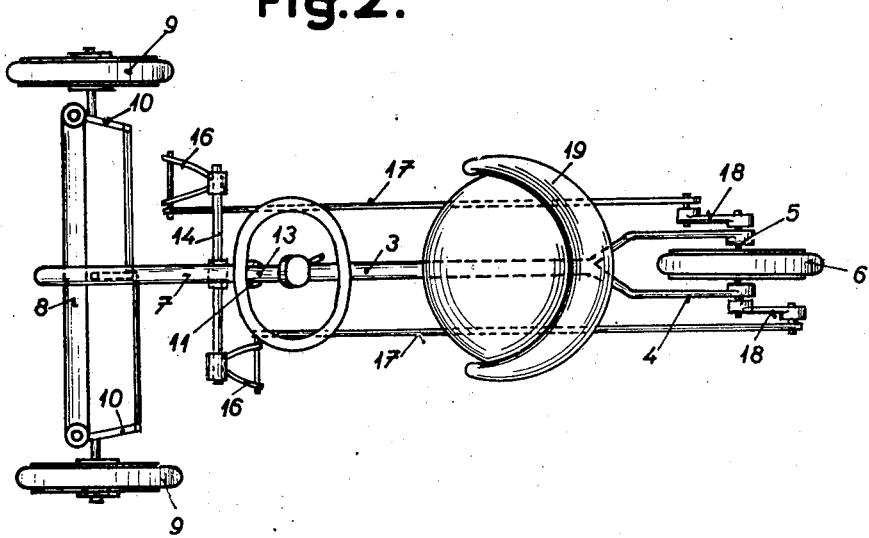

My invention, together with other objects and advantages thereof, will best be understood from the following description of a specific embodiment when read in connection with the accompanying drawing in which Fig. 1 shows a side view of a tricycle embodying my invention, and Fig. 2 a top view thereof.

The tricycle shown in the drawing has a driven rear wheel 6 and a pair of steered front wheels 9. The drive transmission actuated by tread cranks or the like may be of any suitable construction. In the shown embodiment it comprises a pair of swinging bridles 15 suspended on the fixed horizontal axle 14, the lower parts 16 of these bridles serving as pedals and being connected by rods 17 with the two cranks 18 of the driving shaft 5 of the rear wheel 6.

The frame of the tricycle is formed by a single rod or bar or tube 3 which is forked at its rear end to support the driving shaft 5, the rear wheel 6 being set inbetween the prongs 4, and whose front end 7 is bent up and back as shown in Fig. 1.

The front end of the frame 3 is supported by the two steered front wheels 9 which are connected in any known manner by steering knuckles 10 with the axle 8 which is rigidly fixed to the frame 3 at or near its bend. The front wheels 9 are actuated by the steering column 13 and its hand wheel, this steering column being held by the collar 11 situated at or near the end of the frame 3 and reposing in a step bearing 12. However, this steering gear may be of any one of quite numerous forms of construction.

The adjustable seat or saddle 19 is attached by means of a rod 20 to a sleeve 21 which may be shifted along the barlike frame 3 into any desired position and fixed therein by any suitable means such as a screw.

Although I have shown and described a certain specific embodiment of my invention, I am fully aware that many modifications thereof are possible. My invention, therefore, is not to be restricted except insofar as is necessitated by the prior art and by the spirit of the appended claims.

What I claim as my invention is:

1. In a frame for tricycles having a driven rear wheel, a pair of steering front wheels and a steering column actuating said front wheels, the combination comprising a basically J-shaped bar or tube having a curved forward portion extending upward in a vertical plane and being adapted to support the steering column for the front wheels, the end of the essentially horizontally extending arm of said J-shaped member being forked and adapted to hold between its prongs the driving shaft for the rear wheel and a slidable and fixable support on said extending arm adapted to hold a seat.

2. In a frame for tricycles having a driven rear wheel, a pair of steering front wheels and a steering column actuating said front wheels, the combination comprising a basically J-shaped bar or tube having a curved forward portion extending upward in a vertical plane and ending into a sleeve surrounding the upper part of the turnable steering column whose lower end is supported by said J-shaped member at the beginning of its bending, the end of the essentially horizontally extending arm of said J-shaped member being forked and adapted to hold between its prongs and driving shaft for the rear wheel and a slidable and fixable support on said extending arm adapted to hold a seat.

JIŘÍ POLÁČEK.

REFERENCES CITED

The following references are of record in the file of this patent:

UNITED STATES PATENTS

| Number | Name | Date |
|---|---|---|
| 404,562 | Reynolds | June 4, 1889 |
| 1,031,280 | McCarty | July 2, 1912 |
| 1,364,686 | Behm | Jan. 4, 1921 |
| 1,444,320 | McCormick | Feb. 6, 1923 |